(12) United States Patent
Shami

(10) Patent No.: US 10,155,488 B2
(45) Date of Patent: Dec. 18, 2018

(54) ONE-PIECE HEADLINER AND PILLAR TRIM ASSEMBLY OF A VEHICLE

(71) Applicant: Ford Global Technologies, LLC, Dearborn, MI (US)

(72) Inventor: Salman Nazir Shami, Doreen (AU)

(73) Assignee: Ford Global Technologies, LLC, Dearborn, MI (US)

(*) Notice: Subject to any disclaimer, the term of this patent is extended or adjusted under 35 U.S.C. 154(b) by 165 days.

(21) Appl. No.: 15/455,430

(22) Filed: Mar. 10, 2017

(65) Prior Publication Data

US 2017/0297509 A1 Oct. 19, 2017

(30) Foreign Application Priority Data

Apr. 18, 2016 (CN) .......................... 2016 1 0244702

(51) Int. Cl.
| | |
|---|---|
| B60R 13/02 | (2006.01) |
| B60J 1/02 | (2006.01) |
| B60R 21/213 | (2011.01) |
| B60R 21/232 | (2011.01) |
| B62D 25/04 | (2006.01) |
| B62D 65/14 | (2006.01) |

(52) U.S. Cl.
CPC ............ B60R 13/0212 (2013.01); B60J 1/02 (2013.01); B60R 13/025 (2013.01); B60R 21/213 (2013.01); B60R 21/232 (2013.01); B62D 25/04 (2013.01); B62D 65/14 (2013.01); *B60R 2013/0287* (2013.01)

(58) Field of Classification Search
CPC . B60R 13/0212; B60R 13/025; B60R 21/213; B60R 21/232; B60R 2013/0287; B62D 25/04; B62D 65/14; B60J 1/02
See application file for complete search history.

(56) References Cited

U.S. PATENT DOCUMENTS

| | | | | |
|---|---|---|---|---|
| 3,953,067 A | * | 4/1976 | Isola | .................... B60R 13/0206 296/214 |
| 5,018,781 A | * | 5/1991 | Kumasaka | ............. B62D 25/06 296/193.03 |
| 5,105,521 A | * | 4/1992 | Dowd | .................... B60N 3/023 29/214 |
| 6,299,244 B1 | * | 10/2001 | Tarahomi | ............. B62D 23/005 296/191 |
| 6,832,810 B2 | * | 12/2004 | Byma | ................. B60R 13/0218 181/286 |
| 7,182,908 B2 | | 2/2007 | Preisler et al. | |
| 8,251,440 B2 | | 8/2012 | Zarewych et al. | |

(Continued)

FOREIGN PATENT DOCUMENTS

| | | |
|---|---|---|
| EP | 1302370 | 4/2003 |
| EP | 1724157 | 11/2006 |

*Primary Examiner* — Darlene P Condra
(74) *Attorney, Agent, or Firm* — Vichit Chea; Mohr IP Law Solutions, PC

(57) ABSTRACT

A headliner and pillar trim assembly of a vehicle comprises a headliner portion including the headliner cover layer and a headliner backing layer; and a plurality of pillar portions each including a pillar trim and a pillar cover layers. The headliner cover layer and a plurality of the pillar cover layers are formed as a one-piece cover layer, and the headliner backing layer and a plurality of the pillar trims are attached to the headliner cover layer and the plurality of pillar cover layers, respectively.

20 Claims, 5 Drawing Sheets

(56) References Cited

U.S. PATENT DOCUMENTS

| | | | |
|---|---|---|---|
| 8,641,136 B2* | 2/2014 | Kring | B60R 13/0225 |
| | | | 296/214 |
| 8,899,671 B2 | 12/2014 | Huelke | |
| 2004/0197547 A1* | 10/2004 | Bristow | B32B 27/32 |
| | | | 428/325 |
| 2006/0061145 A1* | 3/2006 | Strebe | B62D 25/06 |
| | | | 296/214 |
| 2017/0043737 A1* | 2/2017 | Jin | B60R 21/214 |
| 2017/0057426 A1* | 3/2017 | Astrike | B60R 13/025 |
| 2017/0057427 A1* | 3/2017 | Shibao | B60R 13/0212 |
| 2017/0120843 A1* | 5/2017 | Nedelman | B60R 13/0206 |

* cited by examiner

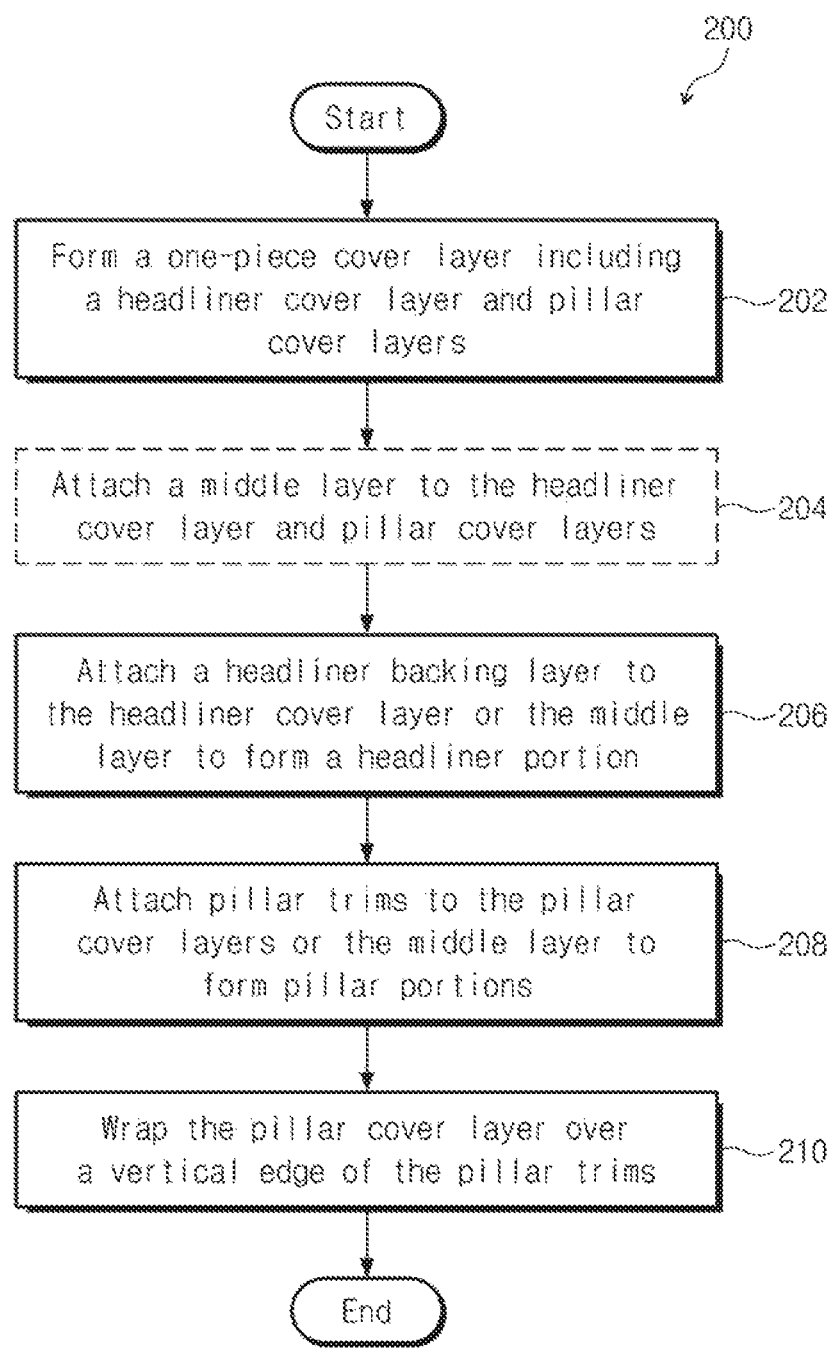

ONE-PIECE HEADLINER AND PILLAR TRIM ASSEMBLY OF A VEHICLE

RELATED APPLICATION

This application claims the benefit of Chinese Patent Application No.: CN 201610244702.3 tiled on Apr. 18, 2016, the entire contents thereof being incorporated herein by reference.

FIELD

The present application relates to a headliner and pillar trim of a vehicle, in particular, relates to a one-piece headliner and pillar trim assembly.

BACKGROUND

Pillars of a vehicle are covered with pillar trims. The pillar trims are commonly formed of hard material such as hard plastic material and thus have several issues for integration with a headliner and other components of the vehicle. For example, it is difficult to control the margin between the pillar trims and the headliner. Further, the color of the pillar trims and the headliner may not match because they are made from different materials. Additional issues arise for the interface between A pillars and other components. For example, a margin between the A pillar and a windscreen is needed to avoid squeak and rattles between the hard pillar trims and the windscreen of the vehicle because the pillar trims are formed from hard material.

SUMMARY

According to one aspect of the present disclosure, a headliner and pillar trim assembly of a vehicle is provided. The headliner and pillar trim assembly may comprise a headliner portion including a headliner cover layer and a headliner backing layer; and a plurality of pillar portions each including a pillar trim and a pillar cover layer. The headliner cover layer and a plurality of pillar cover layers may be formed from one-piece material to be an integral cover layer. The headliner backing layer and a plurality of the pillar trims may be attached to the headliner cover layer and the plurality of pillar cover layers, respectively.

In one embodiment, one-piece material may be made from fabric and the headliner backing layer and the pillar trims may be made from plastic.

In another embodiment, the pillar trims may be spaced apart from the headliner backing layer in a predetermined distance at an interface between the headliner portion and the pillar portions so that the pillar portions are capable of being folded on the headliner portion.

In another embodiment, each pillar portion may include a plurality of segmented pillar trims.

In another embodiment, the headliner and pillar trim assembly may further comprise a headliner middle layer disposed between the headliner cover layer and the headliner backing layer, and a pillar middle layer disposed between the pillar cover layers and the pillar trims.

In another embodiment, the headliner middle layer and the pillar middle layers may be made from foam.

In another embodiment, the headliner middle layer and the pillar middle layers may be made from different materials.

In another embodiment, the plurality of the pillar portions may include A pillar portions to be mounted on A pillars and rear pillar portions to be mounted on pillars that divide a vehicle's rear window from its rear windscreen.

In another embodiment, at least one vertical edge of each of the A pillar portions may be wrapped by the pillar cover layer.

In another embodiment, the plurality of the pillar portions include A pillar portions to be mounted on A pillars, middle pillar portions to be mounted on middle pillars, and rear pillar portions to be mounted on pillars that divide a vehicle's rear window from its rear windscreen.

In another embodiment, each of the pillar cover layers of the middle pillar portions may include a tear seam that allows an area at a top of the middle pillar portion to rip open for a curtain airbag to be deployed.

According to another aspect, a vehicle may comprise a headliner and pillar trim assembly. The headliner and pillar trim assembly may include a headliner portion including the headliner cover layer and a headliner backing layer; and at least A pillar portions each including a pillar trim and a pillar cover layer. The headliner cover layer and a plurality of the pillar cover layers may be formed as a one-piece cover layer and the headliner backing layer and a plurality of the pillar trims may be attached to the headliner cover layer and the plurality of pillar cover layers, respectively. The headliner portion and the A pillar portions may be mounted on a roof and A pillars of the vehicle, respectively.

In one embodiment, at least one vertical edge of each of the A pillar portions may be wrapped by the pillar cover layer.

In another embodiment, the vehicle may comprise a front windscreen, a ceramic band disposed along a side of the front windscreen and adjacent to an A pillar. The ceramic band may cover an A pillar segment exposed to the front windscreen and have a first side adjacent to an edge of the windscreen and a second side opposite the first side. A wrapped vertical edge of the A pillar portion may be disposed on the second side of the ceramic band to leave a zero margin between the front windscreen and the A pillar portion such that the ceramic band is invisible from a passenger compartment.

In another embodiment, the vehicle may further comprise curtain airbags disposed adjacent to sides of the roof. The headliner and pillar trim assembly may further include middle pillar portions to be mounted on middle pillars, and rear pillar portions to be mounted on pillars that divide a vehicle's rear window from its rear windscreen. Each of the middle pillar portions may include a tear seam adjacent to the roof to allow deployment of the curtain air bags.

According to another aspect of the present disclosure, a method of manufacturing a one-piece headliner and pillar assembly of a vehicle is provided. The method may comprise forming a cover layer including a headliner cover layer and a plurality of pillar cover layers; and attaching a headliner backing layer to the headliner cover layer to form a headliner portion; and attaching pillar trims to the plurality of pillar cover layers to form pillar portions.

In one embodiment, attaching each pillar trim to a corresponding pillar cover layer may include attaching segmented pillar trims to the corresponding pillar cover layer In another embodiment, the method may further comprise laminating a middle layer on the cover layer before attaching the headliner backing layer and the pillar trims to the cover layer, and the middle layer may be made of soft material.

In another embodiment, the headliner and pillar assembly may include middle pillar portions to be mounted on middle pillars and the method may further comprise making a tear seam on each of the middle pillar portions, wherein the tear seam is adjacent to an interface of the headliner portion and the pillar portions.

In another embodiment, the method may further comprise wrapping the cover layer over a vertical edge of pillar trims to be mounted on A pillars of the vehicle.

The headliner and pillar trim assembly of the present disclosure addresses the issues of interfacing the pillar trims with the headliner and other components, among other issues. For example, the one-piece cover layer for both headliner portions and pillar portions results in a seamless appearance with uniform color. The soft edge of pillar portions allows the pillar portions to be mounted with zero margin to the windscreen and other components, thus eliminate a noise path and have NVH benefits.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 5 shows an example method to manufacture a headliner and pillar trim assembly according to an embodiment of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

The disclosed headliner and pillar trim assembly will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of headliner and pillar trim assembly are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
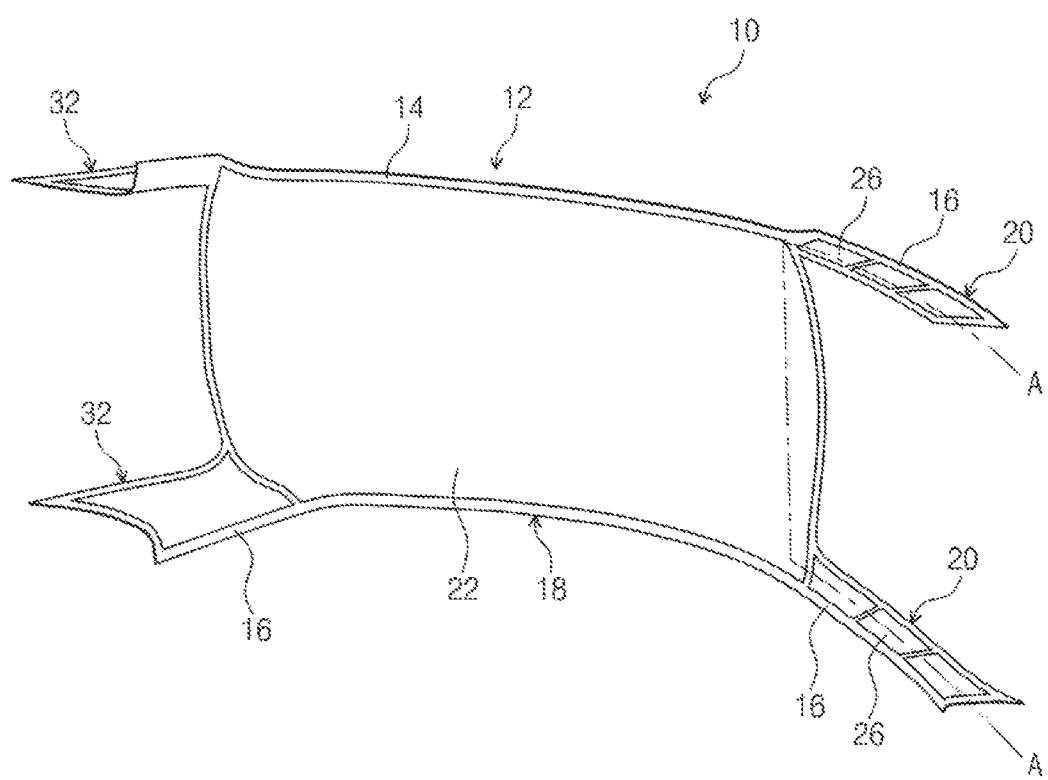
FIG. 1 is a top view of an example headliner and pillar trim assembly of a vehicle according to one embodiment of the present disclosure.
Figure 2:
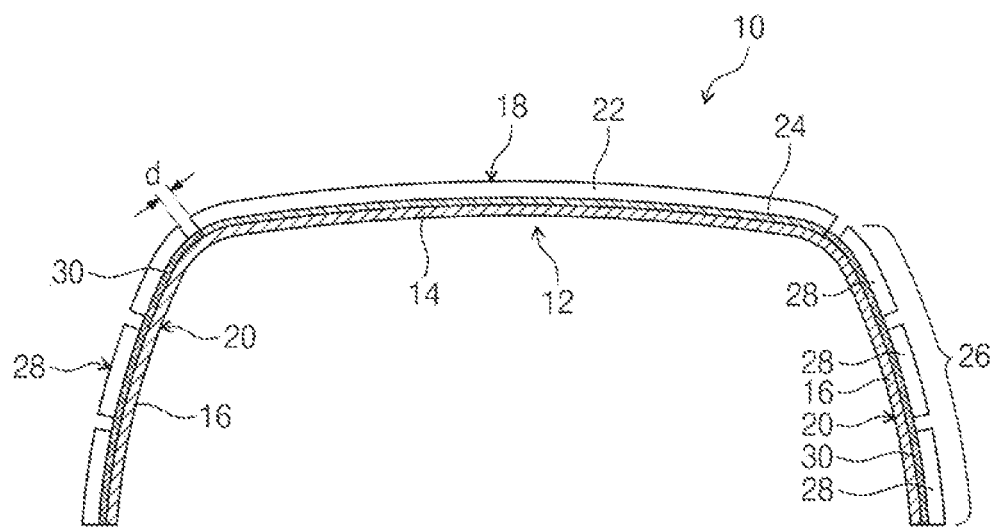
FIG. 2 is a cross-sectional side view of the headliner and pillar trim assembly of FIG. 1 taken along lines A-A, schematically illustrating layers of the headliner and pillar trim assembly.

FIG. 1 shows a top view of an example headliner and pillar trim assembly 10 of a vehicle according to one embodiment of the present disclosure. FIG. 2 shows a cross-sectional side view of the headliner and pillar trim assembly 10 of FIG. 1 taken along lines A-A, illustrating layers of the headliner portion and A pillar portions. As illustrated in FIGS. 1 and 2, the headliner and pillar trim assembly 10 may comprise a one-piece cover layer 12 including a headliner cover layer 14 and pillar cover layers 16. The one-piece cover layer 12 may be made from soft material such as fabric. The fabric may include but not limited to cloth, knit, natural or synthetic composition, or woven or non-woven.

The headliner and pillar trim assembly 10 may comprise a headliner portion 18 and a plurality of pillar portions 20. In some embodiments, the headliner portion 18 may include the headliner cover layer 14 and a headliner backing layer 22. The headliner backing layer 22 may be made from hard material such as plastic (e.g., polypropylene). In some embodiments, the headliner portion 18 may further include a middle layer 24. The middle layer 24 may include foam or impact absorbing material.

The pillar portion 20 may include the pillar cover layer 16 and a pillar trim 26. The pillar trim 26 may be formed from hard material such as plastic (e.g., polypropylene). The pillar trim 26 may be made from the same material as that of headliner backing layer 22 or different material from that of the headliner backing layer 22. As described above, the pillar cover layer 16 in the pillar portion 20 and the headliner cover layer 14 in the headliner portion 18 are formed from one-piece material to be an integral cover layer or the one-piece cover layer 12.

In some embodiments, the pillar trim 26 may include one-piece rigid trim. In other embodiments, the pillar trim 26 may include a plurality of segmented trims 28. In the depicted embodiments, the pillar trim 26 includes three segmented trims 28. The segmented structure provides flexibility to assemble the pillar portions into the vehicle's components. For example, for the pillar portion 20 to be mounted on A pillars of the vehicle, the pillar portion with the segmented hard trim may provide sufficient mobility to be assembled to the end of a top panel of instrument panel.

In some embodiments, the pillar portion 20 may further include a middle layer 30. The middle layer 30 of the pillar portion 20 may be made from foam. In some embodiments, the middle layer 30 of the pillar portion 20 may be made from the same material as the middle layer 24 of the headliner portion 18. In some embodiments, the middle layer 30 of the pillar portion 20 may be made from the material different from the middle layer 24 of the headliner portion 18. For example, the material forming the middle layer 30 of the pillar portion 20 may be formed from soft material to provide good touch feel while having stiffness to support the pillar cover layer.

In some embodiments, the headliner and pillar trim assembly 10 may only comprise pillar portions 20 to be mounted on A pillars of a vehicle. That is, the pillar portions 20 may be A pillar portions. In some embodiments, the headliner and pillar trim assembly 10 may comprise A pillar portions 20 and rear pillar portions 32 to be muffled on C pillars or D pillars (i.e., C pillar portions or D pillar portions). In other words, the headliner and pillar trim assembly 10 may comprise rear pillar portions 32 to be mounted on pillars that divide a vehicle's rear window from its rear windscreen. Because it may be difficult to interface the pillar trim with the windscreens, it may be advantageous to include both A pillar portions 20 and rear pillar portions 32 in the headliner and pillar trim assembly.

In some embodiments, the pillar trims 26 may be spaced apart from the headliner backing layer 22 at a predetermined distance "d" at an interface of the headliner backing layer 22 and the pillar trims 26 for example (see FIG. 2). In this manner, the pillar trim portions 20 can be folded to the headliner portion 18 to facilitate storage and transportation before the headliner and pillar trim assembly is mounted to the vehicle.

Figure 3:
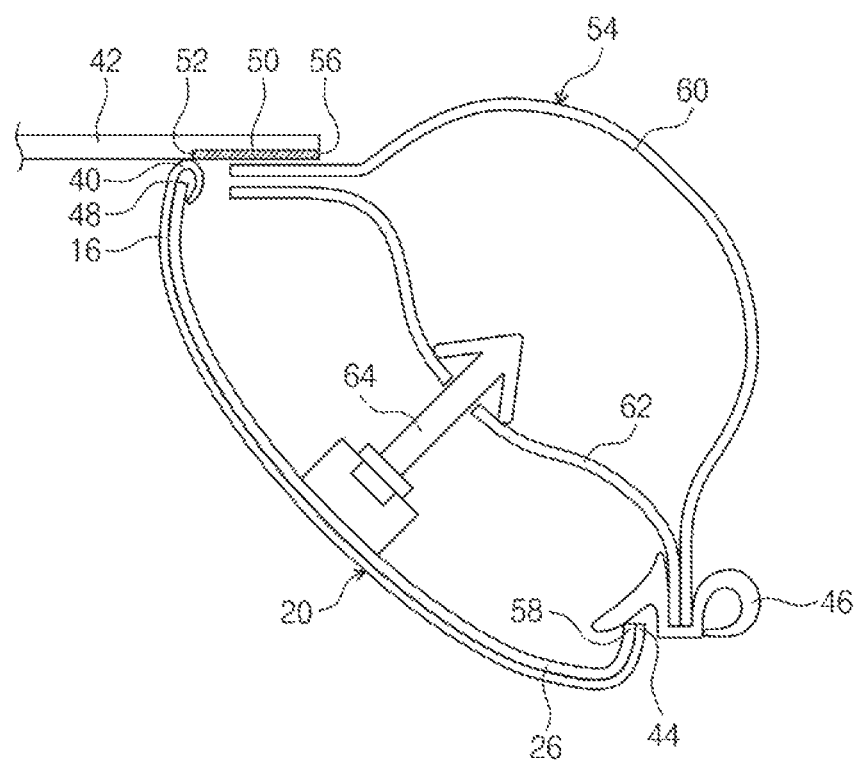
FIG. 3 is a cross-sectional view of art A pillar portion of the headliner and pillar trim assembly of FIG. 1 along with a steel A pillar and a windscreen, schematically illustrating mounting of an A pillar portion on a vehicle.

FIG. 3 is a cross-sectional top view of an A pillar portion of a headliner and pillar trim assembly of FIG. 1 along with a steel A pillar and a windscreen, schematically illustrating mounting of an A pillar portion on the steel A pillar and the windscreen of a vehicle. The pillar portion 20 may be an A pillar portion to be mounted on a steel A pillar of a vehicle. The pillar portion 20 may include a pillar cover layer 16 and a pillar trim 26. As described above in FIGS. 1 and 2, the pillar cover layer may be a one-piece cover layer of the headliner and pillar trim assembly. In some embodiments, the pillar portion 20 may further include a middle layer 30 disposed between the pillar cover layer 16 and the pillar trim 26 (not shown in FIG. 3). A first side 40 of the pillar portion 20 may be mounted on a windscreen 42 and a second side 44 of the pillar portion 20 may be mounted on a door seal 46 of the vehicle. A vertical edge 48 of the pillar trim 26 at the first side 40 may be wrapped by the pillar cover layer 16. In some embodiments, the middle layer 30 may be aligned with the cover layer 16 at the first side 40 of the pillar portion 20, and thus the vertical edge 48 may be covered by both the middle layer 30 and the cover layer 16. As described above with reference to FIGS. 1 and 2, the cover layer 16 may be made from fabric, the middle layer may be made from foam and the pillar trim may be made from hard plastic. That is, the first side 40 of the pillar portion 20 has a soft outer layer supported by foam and/or rigid pillar trim. Thus, the first side 40 of the pillar portion may be disposed to touch the windscreen 42 to ensure a zero margin between the pillar portion 20 and the windscreen 42.

The windscreen 42 may include a ceramic band 50 extending from a top to a bottom at one side of the windscreen 42. The ceramic band 50 may include a first lateral side 52 that is away from an A pillar or a steel A pillar 54 and a second lateral side 56 that is adjacent to the steel pillar 54. The ceramic band 50 covers a section of the steel A pillar 54 so that the steel A pillar 54 is not visible when viewed outside the vehicle. In some embodiments, the first side 40 of the pillar portion 20 may be disposed adjacent to an edge of the ceramic band 50. In one example, the first side 40 of the pillar portion 20 may be disposed along the first lateral side 52 of the ceramic band 50. In this manner, the ceramic band 50 is not visible from a passenger compartment.

In some embodiments, the second side 44 of the pillar portion 20 may have the same configuration as that of the first side 40. In other embodiments, the second side 44 of the pillar portion 20 may have the different configuration from that of the first side 40. For example, a vertical edge 58 of the pillar trim 26 may consist of the pillar cover layer 16 and the middle layer 30 and the pillar trim 26 which are substantially aligned each other. Because the door seal 46 may be made of soft material such as rubber, the hard pillar trim 26 of the pillar portion 20 may contact the door seal 46 while remaining good seal.

FIG. 3 further shows a steel A pillar outer section 60 and steel A pillar inner section 62. The pillar portion 20 may be connected to the steel A pillar inner section 62 by a fastener 64.

Figure 4:
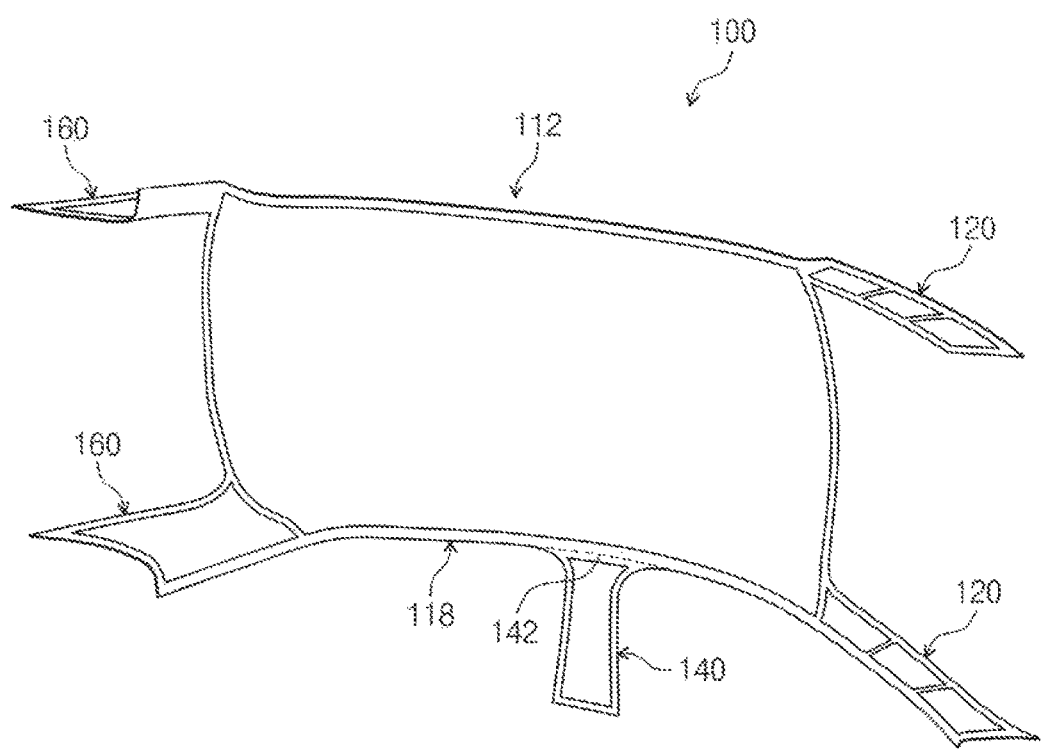
FIG. 4 is a top view of an example headliner and pillar trim assembly of a vehicle according to another embodiment of the present disclosure.

FIG. 4 is a top view of an example headliner and pillar trim assembly 100 of a vehicle according to another embodiment of the present disclosure. For the sake of brevity, in this example, the elements and features similar to those previously shown and described will not be described in much further detail. The headliner and pillar trim assembly 100 may comprise a one-piece cover layer, a headliner portion 118, pillar portions 120 to be mounted on A pillars (i.e., A pillar portions 120), middle pillar portions 140 to mounted on middle pillars and rear pillar portions 160 to be mounted on pillars that divide a vehicle's rear window from its rear windscreen. In some vehicles such as a sedan, the middle pillar portions 140 may be B pillar portions and the rear pillar portions 160 may be C pillar portions. In some vehicles such as a SUV or a van, the middle pillar portions 140 may include B pillar portions and C pillar portions and the rear pillar portions may be D pillar portions. The middle pillar portions 140 may include a tear seam 142. The tear seam 142 may be a weakened segment disposed at an interface or adjacent to the interface of the headliner portion and the pillar trim portion. The tear seam 142 can be ripped open so that a curtain airbag can be deployed. The tear seam 142 may include be a groove, intermittent through-slots or through holes in some embodiments, the groove or the slots may be formed on an inner surface of the cover layer so that they are not visible from a passenger compartment. The tear seam 142 may have any suitable configuration that allows an area at a top of the middle pillar portions 140 to rip open so that a curtain airbag can be deployed.

FIG. 5 shows an example method 200 to manufacture a headliner and pillar trim assembly according to an embodiment of the present disclosure. At 202, method 100 includes forming a one-piece cover layer including a headliner cover layer and pillar cover layers. In some embodiments, the cover layer may be formed by cutting a blank material. In some embodiments, the cover layer may be woven as a single piece. In some embodiments, the cover layer may be formed in a mold. It should be appreciated that any suitable technology can be used to make the one-piece cover layer with the desired shape or configuration.

In some embodiments, a headliner and pillar trim assembly may include middle a portions as described in FIG. 4. A tear seam may be formed adjacent to or on an interface between the headliner cover layer and the pillar cover layer of the middle pillar portions. The tear seam may be formed by any suitable method to weaken a portion of the fabric. For example, the tear seam may be formed by known processes including, but not limited to, laser scoring, sonic knife or heated knife. The tear seam may include be a groove, intermittent through-slots or through hole.

At 204, method 200 includes attaching or laminating a middle layer to the headliner cover layer and the pillar cover layer. In some embodiments, the middle layer for the headliner portion and the pillar portions may include the same material such as foam. In some embodiments, different materials may be used for the middle layers of the headliner portion and the pillar portions. For example, the material for the middle layer of the headliner portion may consist of an impact absorbing material including but not limited to the foam. The material for the middle layer of the pillar portions may consist of a material that provides comfort touch feel including but not limited to foam and thick fabric. In some embodiments, the material for the middle layer in the pillar portions may possess certain rigidity to strengthen edges of the pillar portions. It should be appreciated that the step of attaching the middle layer may be optional and the headliner and/or pillar trim assembly may not include the middle layer. The middle layer may be attached to the cover layer by any known method including, but not limited to, flame bonding, adhesive film, adhesive spray, etc.

At 206, method 200 includes attaching a headliner backing layer to the headliner cover layer or the middle layer to form the headliner portion 18. The headliner backing layer may be attached to the cover layer or the middle layer by any known method including, but not limited to, flame bonding, adhesive film, adhesive spray, etc.

At 208, method 200 includes attaching the pillar trims to the pillar cover layer or the middle layer to form the pillar portions. The pillar trims may be positioned to be spaced away from the headliner backing layer at an interface between the pillar portion and the headliner portion so that the pillar portions may be folded to the headliner portion. In some embodiments, the pillar potions may include a plurality segmented pillar trims and method 200 may include attaching each segmented pillar trim to the middle layer or the pillar cover layer. The headliner hacking layer may be attached to the cover layer or the middle layer by any known method including, but not limited to, flame bonding, adhesive film, adhesive spray, etc.

Next, at 210, method 200 includes wrapping the pillar cover layer over a vertical edge of the pillar trims. In some embodiments, an area of the pillar cover layer of the pillar portions may be configured to be slightly greater than a surface area of the pillar trims so that a side of the pillar cover layer can bend over a vertical edge of the pillar trims such that an edge of the pillar portions includes the pillar cover layer. In some embodiments, only one vertical edge of A pillar portions may be wrapped. The side of the pillar portions wrapped by the pillar cover layer may be positioned on windscreen. In some embodiments, both middle layer and the pillar cover layer may be wrapped over the vertical edge of the pillar trims.

It should be appreciated that any suitable method may be used to assemble the one-piece cover layer, the middle layer, the headliner backing layer, and the pillar trims together. For example, the pillar trims and the headliner backing layer may be disposed in a mold and the middle layer and the cover layer may be laminated or attached sequentially on the pillar trims and the headliner backing layer.

The headliner and pillar trim assembly of the present disclosure have various advantages. For example, because the cover layer of the headliner and pillar trim assembly are formed from one-piece material, the color is identical and there is no seam visible between the pillar trim portions and the headline portion. Further, because the edges of the pillar trims consist of soft material, the A pillar portions can incorporate a return curve at the windscreen so that the vertical edges of the pillar trim can be disposed to cover the ceramic bands with zero margin and accordingly the ceramic bands on the windscreen are not visible from a passenger compartment. Furthermore, the soft material at the edges of the pillar trims make it possible for the pillar portions to be installed with zero margin to other components, which would eliminate a noise path and have NVH benefit. Furthermore, the A pillar portions of the cover layer can hold the pillar trims from being detached during a crash event or upon force, which can eliminate tether or other components that are disposed in the A pillars to hold the pillar trims from being separated.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A headliner and pillar trim assembly of a vehicle, comprising:
    a headliner portion including a headliner cover layer and a headliner backing layer; and
    a plurality of pillar portions each including a pillar trim and a pillar cover layer,
    wherein the headliner cover layer and a plurality of pillar cover layers are formed from one-piece material to be an integral cover layer, the headliner backing layer and a plurality of the pillar trims are attached to the headliner cover layer and the plurality of pillar cover layers, respectively.

2. The headliner and pillar trim assembly of claim 1, wherein the one-piece material is made from fabric and wherein the headliner backing layer and the pillar trims are made from plastic.

3. The headliner and pillar trim assembly of claim 2, wherein the pillar trims are spaced apart from the headliner backing layer in a predetermined distance at an interface of the headliner portion and pillar potions so that the pillar portions are capable of being folded on the headliner portion.

4. The headliner and pillar trim assembly of claim 3, wherein each pillar portion includes segmented pillar trims.

5. The headliner and pillar assembly of claim 2, further comprising a headliner middle layer disposed between the headliner cover layer and the headliner backing layer, and a pillar middle layer disposed between the pillar cover lavers and the pillar trims.

6. The headliner and pillar trim assembly of claim 5, wherein the headliner middle layer and the pillar middle layers are made from foam.

7. The headliner and pillar trim assembly of claim 5, wherein the headliner middle layer and the pillar middle layers are made from different materials.

8. The headliner and pillar trim assembly of claim 1, wherein the plurality of the pillar portions include A pillar portions to be mounted on A pillars and rear pillar portions to be mounted on pillars that divide a vehicle's rear window from its rear windscreen.

9. The headliner and pillar trim assembly of claim 8, wherein at least one vertical edge of each of the A pillar portions is wrapped by the pillar cover layer.

10. The headliner and pillar trim assembly of claim 1, the plurality of the pillar portions include A pillar portions to be mounted on A pillars, middle pillar portions to be mounted on middle pillars, and rear pillar portions to be mounted on pillars that divide a. vehicle's rear window from its rear windscreen.

11. The headliner and pillar trim assembly of claim 10, wherein each of the pillar cover layers of the middle pillar portions includes a tear seam that allows an area at a top of the middle pillar portion to rip open for a curtain airbag to be deployed.

12. A vehicle comprising:
   a headliner and pillar trim assembly including:
      a headliner portion including a headliner cover layer and a headliner backing layer; and
      at least A pillar portions, wherein each of the A pillar portions includes a pillar trim a pillar cover laver,
      wherein the headliner cover layer and a plurality of the pillar cover layers are formed as a one-piece cover layer and the headliner backing layer and a plurality of the pillar trims are attached to the headliner cover layer and the plurality of pillar cover layers, respectively, and
   wherein the headliner portion and the A pillar portions are mounted on a roof and A pillars of the vehicle, respectively.

13. The vehicle of claim 12, wherein at least one vertical edge of each of the A pillar portions is wrapped by the pillar cover layer.

14. The vehicle of claim 13, further comprising
   a front windscreen,
   a ceramic band disposed along a side of the front windscreen and adjacent to an A pillar, wherein the ceramic band covers an A pillar segment exposed to the front windscreen and has a first lateral side that is away from the A pillar and a second lateral side that is adjacent to the A pillar,
   wherein the at least one wrapped vertical edge of the A pillar portion is disposed on the first lateral side of the ceramic band to leave a zero margin between the front windscreen and the A pillar portion such that the ceramic band is not visible from a passenger compartment.

15. The vehicle of claim 12, further comprises curtain airbags disposed adjacent to sides of the roof, wherein the headliner and pillar trim assembly further includes middle pillar portions to be mounted on Middle pillars, and rear pillar portions to be mounted on pillars that divide a vehicle's rear window from its rear windscreen, wherein each of the middle pillar portions includes a tear seam adjacent to the roof to allow deployment of the curtain air bags.

16. A method of manufacturing a one-piece headliner and pillar assembly of a vehicle, comprising:
   forming a cover layer, wherein the cover layer including a headliner cover layer and a plurality of pillar cover layers; and
   attaching a headliner backing layer to the headliner cover layer to form a headliner portion; and
   attaching a plurality of pillar trims to the plurality of pillar cover layers to form pillar portions.

17. The method of claim 16, wherein attaching each pillar trim to a corresponding pillar cover layer includes attaching segmented pillar trims to the corresponding pillar cover layer.

18. The method of claim 16, further comprising attaching a middle layer on the cover layer before attaching the headliner backing layer and the pillar trims to the cover layer, wherein the middle layer is made of soft material.

19. The method of claim 16, wherein the headliner and pillar assembly includes middle pillar portions to be mounted on middle pillars, the method further comprising making a tear seam on each of the middle pillar portions, wherein the tear seam is adjacent to an interface of the headliner portion and the pillar portions.

20. The method of claim 16, further comprising wrapping the cover layer over a vertical edge of pillar trims to be muffled on A pillars of the vehicle.

* * * * *